(12) United States Patent
Worrell

(10) Patent No.: US 7,069,363 B1
(45) Date of Patent: Jun. 27, 2006

(54) ON-CHIP BUS

(75) Inventor: Frank Worrell, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 500 days.

(21) Appl. No.: 10/056,631

(22) Filed: Jan. 25, 2002

Related U.S. Application Data

(60) Provisional application No. 60/271,848, filed on Feb. 27, 2001.

(51) Int. Cl.
*G06F 13/00* (2006.01)
*G06F 13/28* (2006.01)
*G06F 13/14* (2006.01)

(52) U.S. Cl. ............... 710/110; 710/35; 710/51; 710/61; 710/305

(58) Field of Classification Search ............ 710/8, 710/25, 29, 35, 51, 60, 106, 114, 113, 305, 710/110, 58, 61; 365/233, 194; 709/208
See application file for complete search history.

(56) References Cited

U.S. PATENT DOCUMENTS

| | | | | |
|---|---|---|---|---|
| 4,853,847 A * | 8/1989 | Ohuchi | .................. | 713/600 |
| 5,291,080 A * | 3/1994 | Amagasaki | ............... | 327/333 |
| 5,339,395 A * | 8/1994 | Pickett et al. | ............... | 710/305 |
| 5,412,662 A * | 5/1995 | Honma et al. | .............. | 714/718 |
| 5,432,907 A * | 7/1995 | Picazo et al. | ............... | 709/249 |
| 5,878,239 A * | 3/1999 | Furuta | ................... | 710/315 |
| 6,085,261 A * | 7/2000 | McIntyre et al. | ............ | 710/35 |
| 6,122,690 A * | 9/2000 | Nannetti et al. | ........... | 710/311 |
| 6,282,583 B1 * | 8/2001 | Pincus et al. | ............... | 709/400 |
| 6,353,867 B1 * | 3/2002 | Qureshi et al. | ............ | 710/305 |
| 6,442,642 B1 * | 8/2002 | Brooks | ...................... | 710/305 |
| 6,526,518 B1 * | 2/2003 | Catlin et al. | ................ | 713/501 |
| 6,601,126 B1 * | 7/2003 | Zaidi et al. | ................. | 710/305 |
| 6,912,611 B1 * | 6/2005 | Kotlowski et al. | ......... | 710/305 |
| 2001/0010063 A1 * | 7/2001 | Hirose et al. | .............. | 710/240 |

OTHER PUBLICATIONS

AMBA Specification. Revision 2.0. ARM Limited. May 13, 1999. pp. i-viii, 1-1—1-13, 3-1—3-58, and 5-1—5-22.*

* cited by examiner

*Primary Examiner*—Khanh Dang
*Assistant Examiner*—Thomas J. Cleary
(74) *Attorney, Agent, or Firm*—Christopher P. Maiorana, P.C.

(57) ABSTRACT

A bus that may be used in an integrated circuit chip. The bus generally comprises a master interface, a slave interface, and a control logic. The master interface may be configured to (i) receive an early command signal having a predetermined timing relationship to a first clock edge and (ii) present a bus wait signal proximate a second clock edge. The slave interface may be configured to (i) present a command signal a delay after the first clock edge and (ii) receive a slave wait signal. The control logic may be configured to (i) register the early command signal to generate the command signal and (ii) convert the slave wait signal into the bus wait signal.

20 Claims, 11 Drawing Sheets

ON-CHIP BUS

This application claims the benefit of U.S. Provisional Application No. 60/271,848, filed Feb. 27, 2001 which is hereby incorporated by reference in its entirety.

FIELD OF THE INVENTION

The present invention relates to a method and/or architecture for an on-chip bus generally and, more particularly, to a method and/or architecture for an on-chip bus fully synchronized to a clock.

BACKGROUND OF THE INVENTION

An on-chip bus provides communications among microprocessors, input/output devices and on-chip devices on an integrated circuit. Current on-chip bus standards are either proprietary, complex, or both. The complexity is caused in part by restrictive input/output requirements chosen to meet all anticipated needs. Each master device on the on-chip bus must be designed to account for all anticipated forms of transfers with various slave devices. Other factors contributing to the complexity are timing requirements that do not synchronize signals to clock edges. Consequently, master and slave devices attached to the on-chip bus must include circuitry that determines when input signals become valid.

SUMMARY OF THE INVENTION

The present invention concerns a bus that may be used in an integrated circuit chip. The bus generally comprises a master interface, a slave interface, and a control logic. The master interface may be configured to (i) receive an early command signal having a predetermined timing relationship to a first clock edge and (ii) present a bus wait signal proximate a second clock edge. The slave interface may be configured to (i) present a command signal a delay after the first clock edge and (ii) receive a slave wait signal. The control logic may be configured to (i) register the early command signal to generate the command signal and (ii) convert the slave wait signal into the bus wait signal.

The objects, features, and advantages of the present invention include providing a method and/or architecture for on-chip buses that may provide for (i) basic transfers with standardized extensions, (ii) back-to-back single cycle transfers, (iii) transfers fully synchronous to a clock edge, (iv) simple unified timing, (v) burst-type transfers without special protocols, and/or (vi) signals that are active with the same polarity, either high or low.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
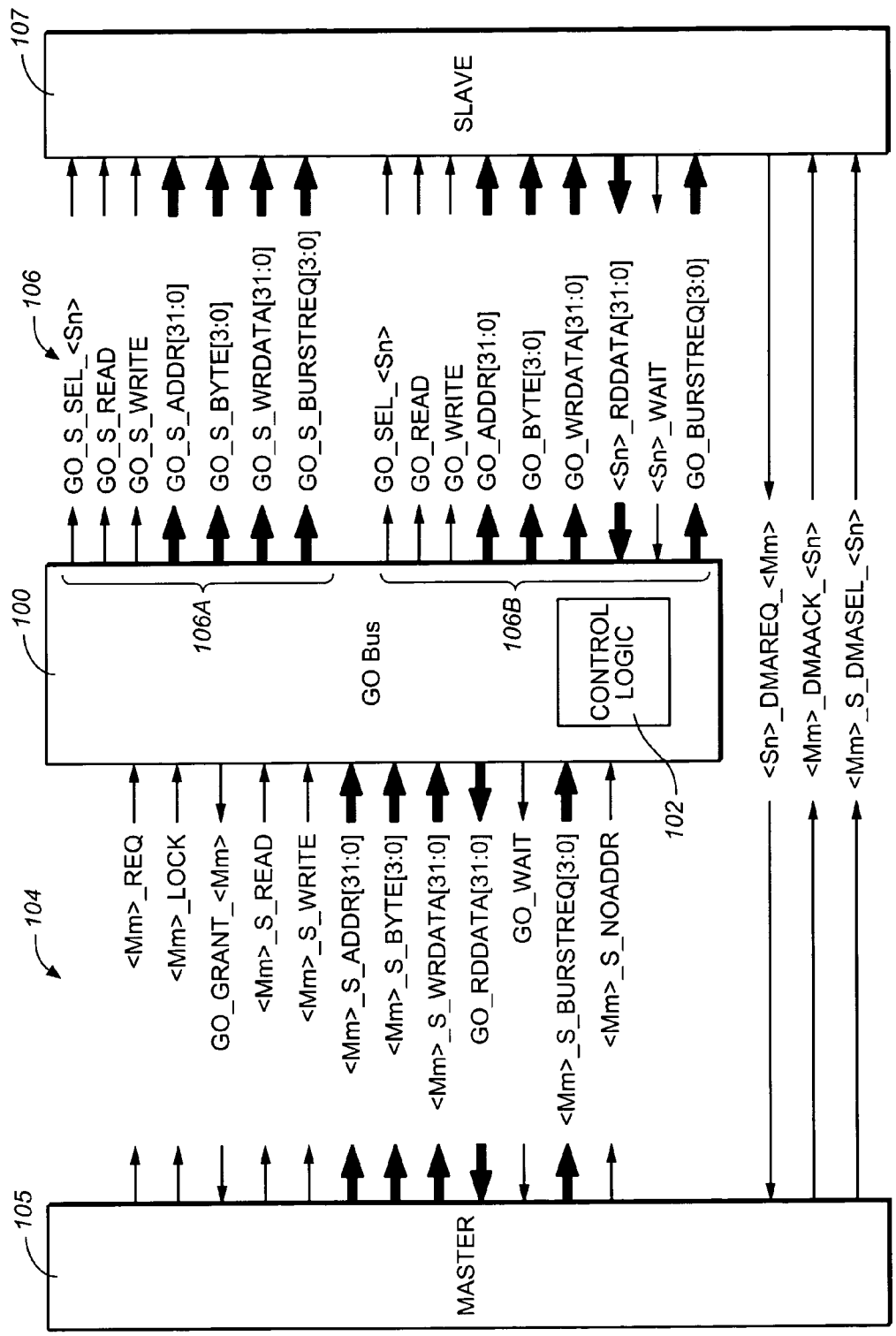
FIG. 1 is a block diagram of a preferred embodiment of the present invention.

Referring to FIG. 1, a block diagram of a bus 100 is shown in accordance with a preferred embodiment of the present invention. The bus 100 is generally referred to as a GO bus in the figures. The bus 100 generally includes a control logic 102. The bus 100 may be used as an on-chip bus.

A master interface 104 may be provided in the bus 100 for communicating with a master device 105. The master interface 104 may be repeated "m" times to accommodate "m" master devices 105a–m (only one shown). Signals presented by the master device 105 to the bus 100 may be indicated by an "<Mm>" prefix, where "m" identifies a particular master device 105m. Signals presented by the bus 100 to the master device 105 may be indicated by a "GO" prefix.

The master interface 104 generally provides input signals to the bus 100 with Early timing. Early timing signals are provided to support an Early slave interface 106A portion of a slave interface 106. An Early timing signal may have a non-random, predetermined timing relationship to a clock edge that is generally valid with a set-up time before and a hold time after a leading edge of a clock cycle (e.g., D-type flip-flop input timing). The leading edge of the clock cycle may be either a rising edge or a falling edge of a clock signal. Arbitration timing signals have early timing but require more set-up time.

The master interface 104 generally receives output signals from the bus 100 with Standard timing. A Standard timing signal may have another non-random, predetermined timing relationship to a clock edge that is generally valid with a delay after the leading edge of the clock cycle (e.g., D-type flip-flop output timing plus logic delay). The control logic 102 may contribute to the delay.

An input signal (e.g., <Mm>_REQ) may be provided at the master interface 104 of the bus 100. The signal <Mm>_REQ may serve as a request signal with Arbitration timing. The master device 105 may present the signal <Mm>_REQ in a logical high state (e.g., digital 1) to request access to the bus 100. The master device 105 may present the signal <Mm>_REQ in a logical low state (e.g., digital 0) when access to the bus 100 is not needed.

An input signal (e.g., <Mm>_LOCK) may be provided at the master interface 104 of the bus 100. The signal <Mm>_LOCK may serve as a lock signal with Arbitration timing. The signal <Mm>_LOCK generally overrides normal bus arbitration to retain control of bus mastership. The master device 105 may present the signal <Mm>_LOCK in the logical high state to request that bus mastership be locked. The master device 105 may present the signal <Mm>_LOCK in the logical low state to allow normal arbitration to change the grant of bus mastership.

An output signal (e.g., GO_GRANT_<Mm>) may be provided at the master interface 104 of the bus 100. The signal GO_GRANT_<Mm> may serve as a grant signal with Arbitration timing. The bus 100 may present the signal GO_GRANT_<Mm> in the logical high state to assign bus mastership to the master device 105. The bus 100 may present the signal GO_GRANT_<Mm> in the logical low state when not assigning bus mastership to the master device 105. In an alternative embodiment having only one master device 105, the signal GO_GRANT_<M1> may be tied to the logical high state always.

An input signal (e.g., <Mm>_S_READ) may be provided at the master interface 104 of the bus 100. The signal <Mm>_S_READ may serve as a read command signal with Early timing. The master device 105 may present the signal <Mm>_S_READ in the logical high state to cause a read data transfer from the slave device 107 to the master device 105. The master device 105 may present the signal <Mm>_S_READ in the logical low state when the read data transfer from the slave device 107 to the master device 105 is not required.

Another input signal (e.g., <Mm>_S_WRITE) may be provided at the master interface 104 of the bus 100. The signal <Mm>_S_WRITE may serve as a write command signal with Early timing. The master device 105 may present the signal <Mm>_S_WRITE in the logical high state to cause a write data transfer from the master device 105 to the slave device 107. The master device 105 may present the signal <Mm>_S_WRITE in the logical low state when the write data transfer from the master device 105 to the slave device 107 is not required.

An input signal (e.g., <Mm>_S_ADDR) may be provided at the master interface 104 of the bus 100. The signal <Mm>_S_ADDR may serve as an address signal with Early timing. The master device 105 may present the signal <Mm>_S_ADDR to identify an address and/or slave device 107 involved in a read or write data transfer. In a preferred embodiment, the signal <Mm>_S_ADDR is generally a 32-bit wide address. Other widths may be used within the present invention to meet the design criteria of a particular implementation.

An input signal (e.g., <Mm>_S_BYTE) may be provided at the master interface 104 of the bus 100. The signal <Mm>_S_BYTE may serve as a byte select signal with Early timing. The master device 105 may present the signal <Mm>_S_BYTE to enable and disable portions of an input signal (e.g., <Mm>_S_WRDATA) and an output signal (e.g., GO_RDDATA). In a preferred embodiment, each bit of the signal <Mm>_S_BYTE enables/disables one byte of the signals <Mm>_S_WRDATA and GO_RDDATA. In particular, bits 0, 1, 2 and 3 of the signal <Mm>_S_BYTE may enable/disable bits 00 to 07, bits 08 to 15, bits 16 to 23, and bits 24 to 31 respectively of the signals <Mm>_S_WRDATA and GO_RDDATA. Other associations between the bits of the signal <Mm>_S_BYTE and the bits of the signals <Mm>_S_WRDATA and GO_RDDATA may serve to meet the design criterial of a particular implementation.

The signal <Mm>_S_WRDATA may be provided at the master interface 104 of the bus 100. The signal <Mm>_S_WRDATA may serve as a write data signal with Early timing. The master device 105 may present the signal <Mm>_S_WRDATA as part of the write data transfer from the master device 105 to the slave device 107. In a preferred embodiment, the signal <Mm>_S_WRDATA is generally a 32-bit wide word. Other widths may be used within the present invention to meet the design criteria of a particular implementation.

The signal GO_RDDATA may be provided at the master interface 104 of the bus 100. The signal GO_RDDATA may serve as a read data signal with Standard timing. The bus 100 may present the signal GO_RDDATA as part of the read data transfer from the slave device 107 to the master device 105. In a preferred embodiment, the signal GO_RDDATA may be implemented as a 32-bit wide word. Other widths may be used within the present invention to meet the design criteria of a particular implementation.

An output signal (e.g., GO_WAIT) may be provided at the master interface 104 of the bus 100. The signal GO_WAIT may serve as a bus wait signal with Standard timing. The bus 100 may present the signal GO_WAIT in the logical low state during the leading edge of the clock cycle to indicate an end to one transaction and a simultaneous start to a next transaction. The bus 100 may present the signal GO_WAIT in the logical high state during the leading edge of the clock cycle to indicate a continuation of the current transaction into a following clock cycle.

An optional input signal (e.g., <Mm>_S_BURSTREQ) may be provided at the master interface 104 of the bus 100. The signal <Mm>_S_BURSTREQ may serve as a burst request signal with Early timing. The master device 105 may present the signal <Mm>_S_BURSTREQ to specify a number of commands that will follow. The initial signal <Mm>_S_BURSTREQ generally provides a hint to the slave device 107 that a burst transaction is about to begin. The slave device 107 may use the hint to prefetch reads. The signal <Mm>_S_BURSTREQ is generally intended for use with read transactions. However, the signal <Mm>_S_BURSTREQ may be permitted with write transactions. A separate burst request should accompany every read/write command within the burst transaction. Each signal <Mm>_S_BURSTREQ generally indicates the number of commands remaining in the burst transaction.

An optional input signal (e.g., <Mm>_S_NOADDR) may be provided at the master interface 104 of the bus 100. The signal <Mm>_S_NOADDR may serve as a no-address signal with Early timing. The master device 105 may present the signal <Mm>_S_NOADDR to inhibit address decoding by the control logic 102 during a direct memory access (DMA) transaction. The signal <Mm>_S_NOADDR generally forces several output signals (e.g., GO_S_SEL_<Sn> and GO_SEL_<Sn>) to an inactive condition. Consequently, the master device 105 presenting the signal <Mm>_S_NOADDR in an asserted state may select the slave device 107 using another signal (e.g., <Mm>_S_DMASEL_<Sn>) instead of the signal <Mm>_S_ADDR.

A slave interface 106 may be provided on the bus 100 for communicating with the slave device 107. The slave interface 106 may be repeated "n" times to accommodate "n" slave devices 107a–n (only one shown). Signals presented by the slave device 107 to the bus 100 may be indicated by a "<Sn>" prefix, where "n" identifies a particular slave device 107n. Signals presented by the bus 100 to the slaves may be indicated by a "GO" prefix.

The slave interface 106 generally comprises an Early slave interface 106A and a Standard slave interface 106B. The Early slave interface 106A generally provides output signals with Early timing. The Early slave interface 106A may be used to support single clock cycle access to the slave device 107. For example, synchronous random access memories generally require address, write data and control signals to be valid before the leading edge of the clock cycle. The Standard slave interface 106B generally provides input and output signals with the Standard type timing. The bus 100 may generate some of the Standard signals presented to the slave device 107 by registering the Early signals presented to the slave device 107.

The output signal GO_S_SEL_<Sn> may be provided at the Early slave interface 106A of the bus 100. The signal GO_S_SEL_<Sn> may serve as a select signal with Early timing. The bus 100 may present signal GO_S_SEL_<Sn> based upon the signals <Mm>_S_ADDR and <Mm>_S_NOADDR of the master device 105 having bus mastership. The slave device 107 may receive one or more signals GO_S_SEL_<Sn>. The bus 100 may present the signal GO_S_SEL_<Sn> in the logical high state during the leading edge of the clock cycle to indicate that the slave device 107 has been selected. The bus 100 may present the signal GO_S_SEL_<Sn> in the logical low state during the leading edge of the clock cycle to indicate that the slave device 107 has not been selected.

An output signal (e.g., GO_S_READ) may be provided at the Early slave interface 106A of the bus 100. The signal GO_S_READ may serve as a read command signal with Early timing. The bus 100 may present the signal <Mm>_S_READ from the master device 105 having bus mastership as the signal GO_S_READ. The signal GO_S_READ need not be presented where the slave device 107 is a write-only type device.

An output signal (e.g., GO_S_WRITE) may be provided at the Early slave interface 106A of the bus 100. The signal GO_S_WRITE may serve as a write command signal with Early timing. The bus 100 may present the signal <Mm>_S_WRITE from the master device 105 having bus mastership as the signal GO_S_WRITE. The signal GO_S_WRITE need not be presented where the slave device 107 is a read-only type device.

An output signal (e.g., GO_S_ADDR) may be provided at the Early slave interface 106A of the bus 100. The signal GO_S_ADDR may serve as an address signal with Early timing. The bus 100 may present the signal <Mm>_S_ADDR from the master device 105 having bus mastership as the signal GO_S_ADDR.

An output signal (e.g., GO_S_BYTE) may be provided at the Early slave interface 106A of the bus 100. The signal GO_S_BYTE may serve as a byte select signal with Early timing. The bus 100 may present the signal <Mm>_S_BYTE from the master device 105 having bus mastership as the signal GO_S_BYTE.

An output signal (e.g., GO_S_WRDATA) may be provided at the Early slave interface 106A of the bus 100. The signal GO_S_WRDATA may serve as a write data signal with Early timing. The bus 100 may present the signal <Mm>_S_WRDATA from the master device 105 having bus mastership as the signal GO_S_WRDATA.

An output signal (e.g., GO_S_BURSTREQ) may be provided at the Early slave interface 106A of the bus 100. The signal GO_S_BURSTREQ may serve as a burst request signal with Early timing. The bus 100 may present the signal <Mm>_S_BURSTREQ from the master device 105 having bus mastership as the signal GO_S_BURSTREQ.

Several output signals (e.g., GO_SEL_<Sn>, GO_READ, GO_WRITE, GO_ADDR, GO_BYTE, GO_WRDATA, and GO_BURSTREQ) may be provided at the Standard slave interface 106B of the bus 100. The signals GO_SEL_<Sn>, GO_READ, GO_WRITE, GO_ADDR, GO_BYTE, GO_WRDATA, and GO_BURSTREQ may serve as a select, read command, write command, address, byte select, write data, and burst request signals respectively with Standard timing. The bus 100 may generate the signals GO_SEL_<Sn>, GO_READ, GO_WRITE, GO_ADDR, GO_BYTE, GO_WRDATA, and GO_BURSTREQ by registering the signals GO_S_SEL_<Sn>, GO_S_READ, GO_S_WRITE, GO_S_ADDR, GO_S_BYTE, GO_S_WRDATA, and GO_S_BURSTREQ respectively.

An input signal (e.g., <Sn>_RDDATA) may be provided at the Standard slave interface 106B of the bus 100. The signal <Sn>_RDDATA may serve as a read data signal with Standard timing. In a preferred embodiment, the signal <Sn>_RDDATA may be implemented as a 32-bit wide word. Other widths may be used within the present invention to meet the design criteria of a particular implementation.

An input signal (e.g., <Sn>_WAIT) may be provided at the Standard slave interface 106B of the bus 100. The signal <Sn>_WAIT may serve as a slave wait request signal with Standard timing. The slave device 107 may present the signal <Sn>_WAIT in the logical high state when the slave device 107 is busy and cannot complete the current transaction. The slave device 107 may present the signal <Sn>_WAIT in the logical low state when the slave device 107 is ready to complete to the current transaction. The slave device 107 should present the signal <Sn>_WAIT in the proper state during each clock cycle.

Three optional signals (e.g., <Sn>_DMAREQ_<Mm>, <Mm>_DMAACK_<Sn>, and <Mm>_S_DMASEL_<Sn>) may be provided between the master device 105 and the slave device 107 to support DMA transactions. The signals <Sn>_DMAREQ_<Mm>, <Mm>_DMAACK_<Sn>, and <Mm>_S_DMASEL_<Sn> may be routed through or externally to the bus 100. FIG. 1 shows a preferred embodiment where the signal <Sn>_DMAREQ_<Mm>, <Mm>_DMAACK_<Sn>, and <Mm>_S_DMASEL_<Sn> are routed external to the bus 100.

The signal <Sn>_DMAREQ_<Mm> may be presented by the slave device 107 to the master device 105. The signal <Sn>_DMAREQ_<Mm> may serve as a DMA request signal with Arbitration timing. The signals <Mm>_DMAACK_<Sn> and <Mm>_S_DMASEL_<Sn> may be presented by the master device 105 to the slave device 107. The signal <Mm>_DMAACK_<Sn> may serve as a DMA acknowledge signal with Early timing. The signal <Mm>_S_DMASEL_<Sn> may serve as a DMA select signal with Early timing.

The slave device 107 may present the signal <Sn>_DMAREQ_<Mm> to request a DMA transfer. The master device 105 may present the signal <Mm>_DMAACK_<Sn> to the slave device 107 to acknowledge the DMA request. The master device 105 may present the signal <Mm>_S_DMASEL_<Sn> to select the slave device 107 when the master device 105 performs a DMA transfer. The master device 105 may also assert the signal <Mm>_S_NOADDR, described above, to inhibit address decoding by the bus 100 and force the signals GO_S_SEL_<Sn> and GO_SEL_<Sn> to the inactive condition.

Figure 2:
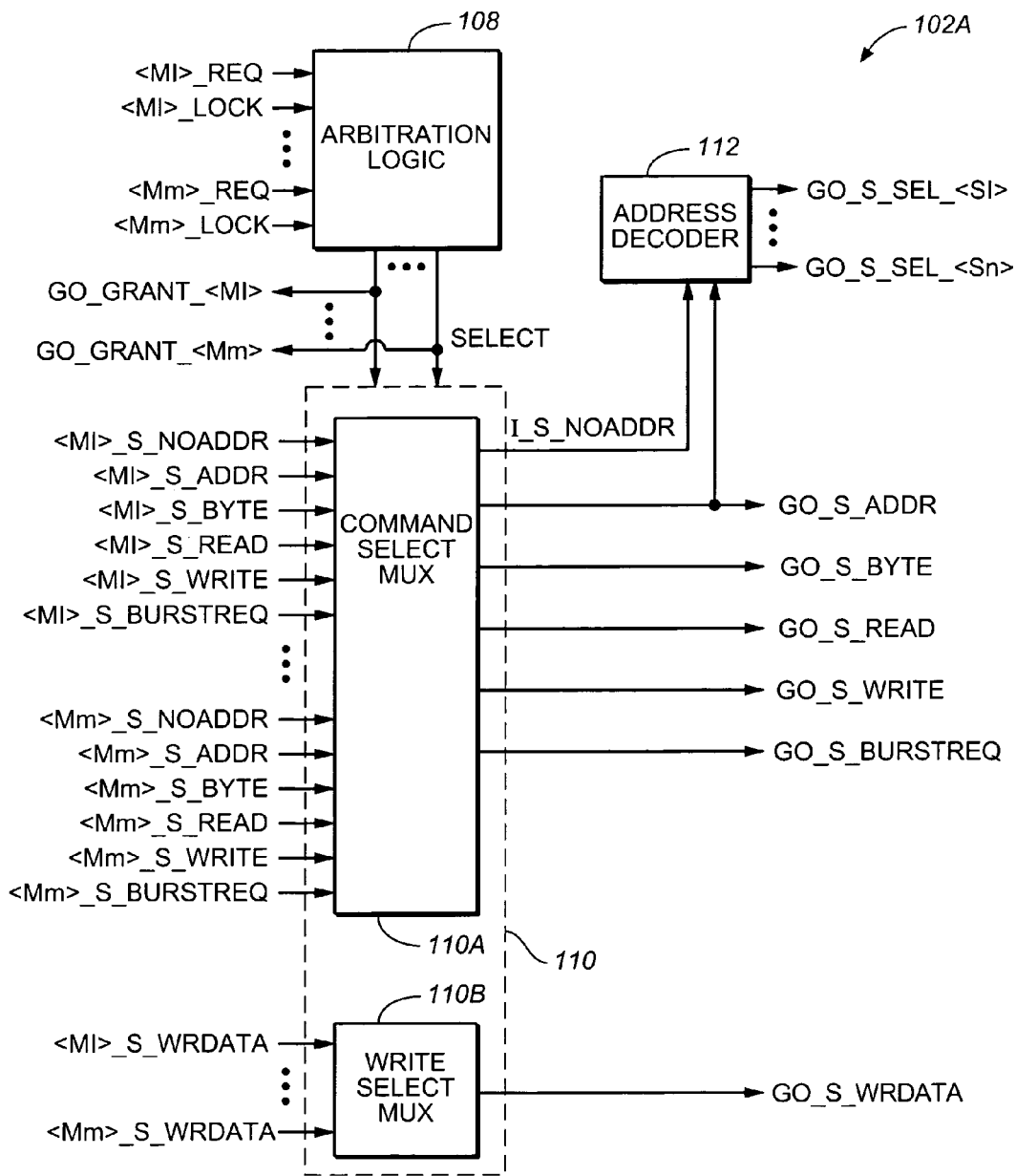
FIG. 2 is a block diagram of a portion of a first embodiment of a control logic.

Referring to FIG. 2, a block diagram of an embodiment of a first portion 102A of the control logic 102 is shown. The first portion 102A generally comprises an arbitration logic 108, multiplexers 110, and an address decoder 112. The multiplexers 110 generally includes a command select multiplexer 110A and a write data select multiplexer 110B.

The arbitration logic 108 generally receives the signals <Mm>_REQ and the signals <Mm>_LOCK from the masters. The arbitration logic 108 may present the signals GO_GRANT_<Mm> to indicate which master device 105 has been granted bus mastership. The signals GO_GRANT_<Mm> as a group generally comprise a signal (e.g., SELECT). The signal SELECT may serve as a selection signal received by the command select multiplexer 110A and the write data select multiplexer 110B.

The command select multiplexer 110A generally routes a selected set of signals from a selected master device 105 (having bus mastership) to the slave device 107. Selection is based upon the signal SELECT. Each set of signals may include, but is not limited to the signals <Mm>_S_NOADDR, <Mm>_S_ADDR, <Mm>_S_BYTE, <Mm>_S_READ, <Mm>_S_WRITE, and <Mm>_S_BURSTREQ. The command select multiplexer 110A may present the selected set of signals as the signals I_S_NOADDR, GO_S_ADDR, GO_S_BYTE, GO_S_READ, GO_S_WRITE, and GO_S_BURSTREQ respectively. The prefix "I" for the signal I_S_NOADDR generally indicates an internal signal.

The write data select multiplexer 110B generally routes a selected signal <Mm>_S_WRDATA from the selected master device 105 to the slave device 107. Selection is based upon the signal SELECT. The write data select multiplexer 110B may present the selected signal <Mm>_S_WRDATA as the signal GO_S_WRDATA.

The address decoder 112 may receive the signals GO_S_ADDR and I_S_NOADDR from the command select multiplexer 110A. The address decoder 112 may present the signals GO_S_SEL_<Sn> in response to the signals GO_S_ADDR and I_S_NOADDR. With the signal I_S_NOADDR in the deasserted state, the logical high or logical low state of the signals GO_S_SEL_<Sn> is generally determined by decoding of the signal GO_S_ADDR. In general, only one of the signals GO_S_SEL_<Sn> should have the logic high state at any given time. With the signal I_S_NOADDR in the asserted state, all of the signals GO_S_SEL_<Sn> should be in the logical low state.

When the on-chip bus 100 is in communication with two or more master devices 105, the arbitration logic 108 may provide arbitration among the master devices 105a–m for bus mastership. When the bus 100 is in communication with only one master device 105, then the arbitration logic 108 and multiplexers 110 may not be required.

The address decoder 112 generally presents one or more signals GO_S_SEL_<Sn> for each of the slave devices 107. The address decoder 112 may be implemented as wide logical AND gates with the appropriate inputs inverted. Other implementations of the address decoder 112 may be used within the present invention to meet the design criteria of a particular implementation.

Figure 3:
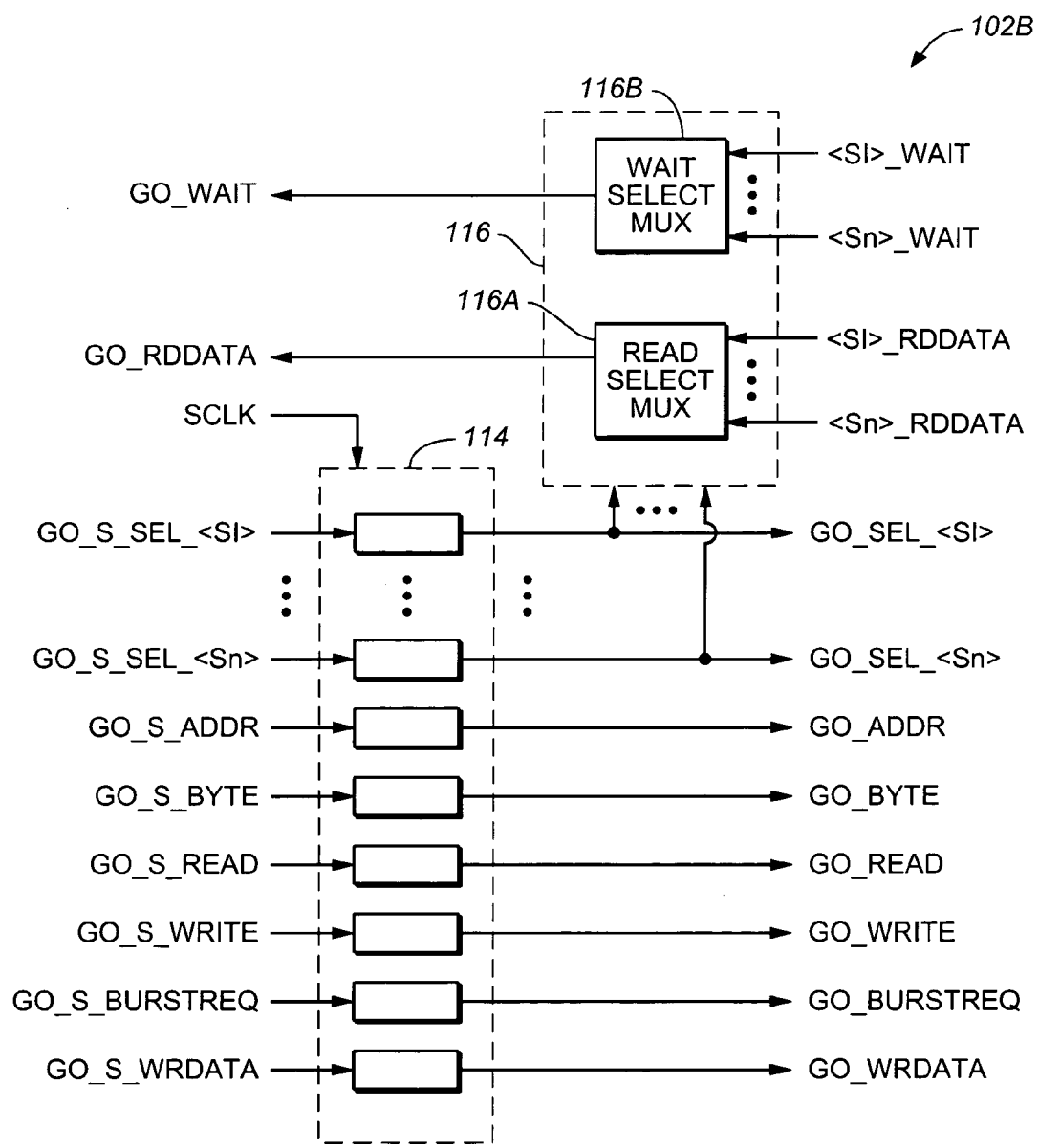
FIG. 3 is a block diagram of another portion of the first embodiment of the control logic.

Referring to FIG. 3, a block diagram of an embodiment of a second portion 102B of the control logic 102 is shown. The second portion 102B generally comprises multiple registers 114 and multiple multiplexers 116. The multiple multiplexers 116 generally comprises a read data select multiplexer 116A and a wait select multiplexer 116B.

The multiple registers 114 generally receives a clock signal (e.g., SCLK) and the Early output signals that are presented at the Early slave interface 106A. The clock signal SCLK may serve as a system clock. The Early output signals include, but are not limited to the signals GO_S_SEL_<Sn>, GO_S_ADDR, GO_S_BYTE, GO_S_READ, GO_S_WRITE, GO_S_BURSTREQ, and GO_S_WRDATA. The multiple registers 114 may present the Standard output signals at the Standard slave interface 106B. The Standard signals may include, but are not limited to the signals GO_SEL_<Sn>, GO_ADDR, GO_BYTE, GO_READ, GO_WRITE, GO_WRDATA, and GO_BURSTREQ.

The read data select multiplexer 116A may receive the signals <Sn>_RDDATA at the Standard slave interface 106B from the slave devices 107a–n. The read data select multiplexer 116A may present the signal GO_RDDATA at the master interface 104. The wait select multiplexer 116B may receive the signals <Sn>_WAIT at the Standard slave interface 106B from the slave devices 107a–n. The wait select multiplexer 116B may present the signal GO_WAIT at the master interface 104.

The read data select multiplexer 116A is generally operative to route a particular signal <Sw>_RDDATA (where w may range from a to n) from among the signals <Sn>_RDDATA of the slave devices 107a–n into the signal GO_RDDATA. The particular signal <Sw>_RDDATA may be selected based upon the signals GO_SEL_<Sn>. The read data select multiplexer 116A may be implemented as multiple logical AND functions followed by multiple logical OR functions. The AND functions may gate the various signals <Sn>_RDDATA using the signals GO_SEL_<Sn> respectively. The OR functions may combine the gated signals <Sn>_RDDATA to present the signal GO_RDDATA. Other implementations of the read data select multiplexer 116A may be implemented to meet the design criteria of a particular implementation.

The wait select multiplexer 116B is generally operative to route a particular signal <Sw>_WAIT (where w may range from a to n) from among the signals <Sn>_WAIT of the slave devices 107a–n into the signal GO_WAIT. The particular signal <Sw>_WAIT may be selected based upon the signals GO_SEL_<Sn>. The wait select multiplexer 116B may be implemented as multiple logical AND functions followed by a logical OR function. The AND functions may gate the various signals <Sn>_WAIT using the signals GO_SEL_<Sn> respectively. The OR function may combine the gated signals <Sn>_WAIT to present the signal GO_WAIT. Other implementations of the wait select multiplexer 116B may be implemented to meet the design criteria of a particular implementation.

Figure 4:
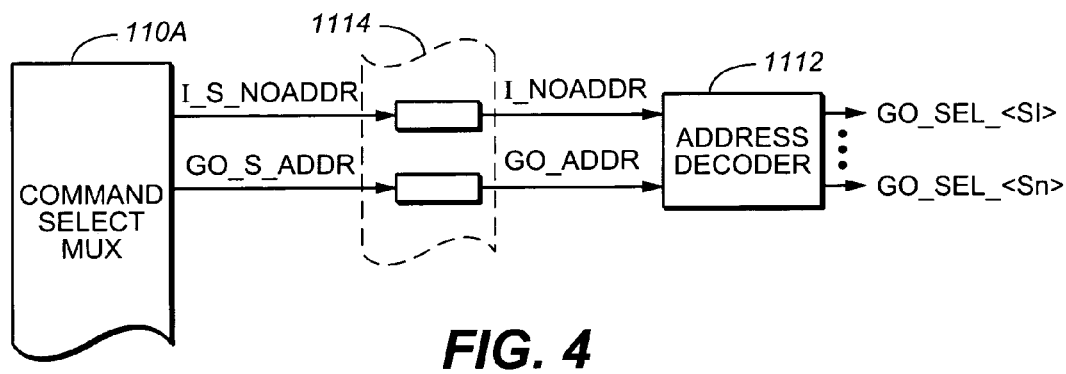
FIG. 4 is a block diagram of a portion of a second embodiment of the control logic.

Referring to FIG. 4, a block diagram of a portion of an alternative embodiment of the control logic 102 is shown. Here, multiple registers 1114 may be disposed between the command select multiplexer 110A and an address decoder 1112. In particular, the multiple registers 1114 may receive and buffer the signals GO_S_ADDR and I_S_NOADDR. The multiple registers 1114 may present the buffered signals GO_S_ADDR and I_S_NOADDR as the signal GO_ADDR and another signal (e.g., I_NOADDR) respectively. The prefix "I" of the signal I_NOADDR generally indicates an internal signal. The address decoder 1112 may operate the same as the address decoder 112 from FIG. 2 but use Standard input signals.

Figure 5:
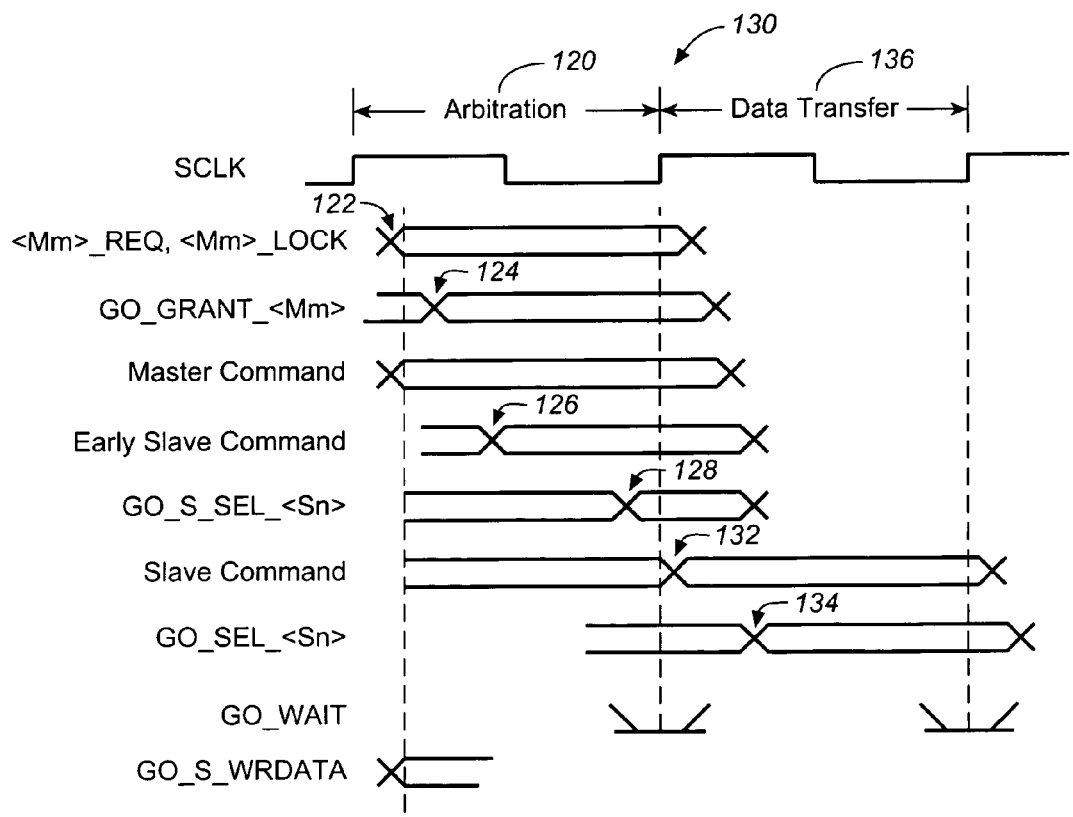
FIG. 5 is a timing diagram of an arbitration cycle.

Referring to FIG. 5, a timing diagram of an arbitration cycle 120 is shown. One or more master devices 105a–m may request bus mastership basically simultaneously. To request bus mastership, a master device 105 may present the signal <Mm>_REQ in the logical high state (e.g., time 122). The arbitration logic 108 generally selects a particular master device 105x (where x may range from a to m) for bus mastership by presenting the signal GO_GRANT_<Mx> in the logical high state. A transition of the signal GO_GRANT_<Mx> is generally delayed by the arbitration logic 108 until a time (e.g., time 124) after the time 122. The particular master device 105x may lock the bus mastership by presenting the signal <Mx>_LOCK in the logical high state at approximately time 122. Locking the bus mastership may halt any further arbitration.

Approximately simultaneously with requesting bus mastership, the particular master device 105*x* may present a signal (e.g., MASTER COMMAND) in the appropriate logical states in anticipation of being granted bus mastership. The signal MASTER COMMAND generally comprises the signals <Mm>_S_READ, <Mm>_S_WRITE, <Mm>_S_ADDR, <Mm>_S_BYTE, <Mm>_S_BURSTREQ, and <Mm>_S_NOADDR.

After granting bus mastership, the control logic 102 generally presents the signal MASTER COMMAND to the slave devices 107*a*–*n* in the form of a signal (e.g., EARLY SLAVE COMMAND). The signal EARLY SLAVE COMMAND generally comprises the signals GO_S_READ, GO_S_WRITE, GO_S_ADDR, GO_S_BYTE, and GO_S_BURSTREQ. The signal EARLY SLAVE COMMAND is generally delayed from the signal MASTER COMMAND by the command select multiplexer 110A until a time (e.g., time 126) after time 124.

After granting bus mastership, the circuit 102 generally selects the signal GO_S_ADDR received from the particular master device 105*x*. The signal GO_S_ADDR may be presented to the address decoder 112 starting at the time 126. After a propagation delay through the address decoder 112, the signals GO_S_SEL_<Sn> may be presented to the slave devices 107*a*–*n* at a later time (e.g., time 128).

Upon a leading edge (e.g., edge 130) of the clock signal SCLK following the arbitration cycle 120, the multiple registers 114 store or register the signal EARLY SLAVE COMMAND. After a delay period, the multiple registers 114 generally present a signal (e.g., SLAVE COMMAND) to the slave devices 107*a*–*n* at a time (e.g., time 132) after the leading edge 130 of the clock signal SCLK. The signal SLAVE COMMAND generally comprises the signals GO_READ, GO_WRITE, GO_ADDR, GO_BYTE, and GO_BURSTREQ.

The control logic 102 generally presents the signals GO_SEL_<Sn> at a time (e.g., time 134) after the leading edge 130 of the clock signal SCLK. The signals GO_SEL_<Sn> may be delayed from the time 130 due to a propagation delay of the multiple registers 114 in the embodiment shown in FIG. 3. The signals GO_SEL_<Sn> may be delayed from the time 130 due to a propagation delay of the multiple registers 1114 and the address decoder 1112 in the embodiment shown in FIG. 4.

The signal GO_WAIT generally should be in the logical low state proximate the leading edge 130 of the clock signal SCLK. The signal GO_WAIT in the logical low state during the leading edge 130 generally indicates an end to the arbitration cycle 120 and the start of a next cycle (e.g., data transfer 136). If the signal GO_WAIT is in the logical high state during the leading edge 130, then the arbitration cycle 120 may be continued into the next cycle of the clock signal SCLK.

Figure 6:
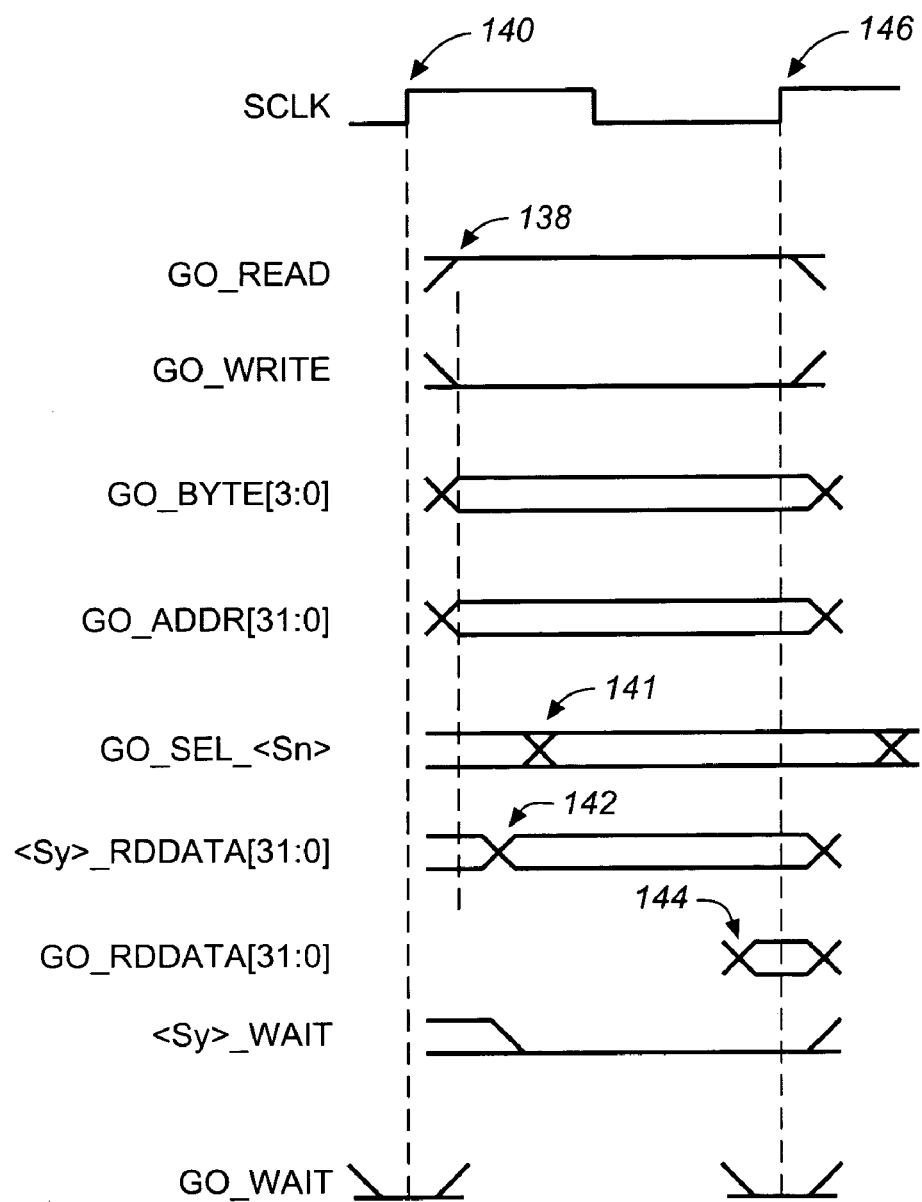
FIG. 6 is a timing diagram of a read data transfer type transaction with no wait cycles.

Referring to FIG. 6, a timing diagram of a read data transfer type transaction with no wait cycles is shown. The signals GO_READ, GO_WRITE, GO_BYTE, and GO_ADDR may be presented to the slave devices 107*a*–*n* at a time (e.g., time 138) after a leading edge (e.g., edge 140) of the clock signal SCLK. After the propagation delay through the address decoder 1112, the signals GO_SEL_<Sn> may be presented to the slave devices 107*a*–*n* at a later time (e.g., time 141).

At another time (e.g., time 142) a particular slave device 107*y* (where y may range from a to n) may respond to the read transaction. The particular slave device 107*y* may present the requested data in the signal <Sy>_RDDATA at time 142. The read data select multiplexer 116A may present the requested data in the signal GO_RDDATA. The signal GO_RDDATA may be delayed until a time (e.g., time 144) after the signal <Sy>_RDDATA becomes valid at time 142 due to a propagation delay through the read data select multiplexer 116A.

Before the next leading edge (e.g., edge 146) of the clock signal SCLK, the particular slave device 107*y* may present the signal <Sy>_WAIT in the logical low state. The signal <Sy>_WAIT in the logical low state during the next leading edge 146 generally indicates an end to the read data transfer and the start of the next transaction. The master device 105 may thus accept the requested data in the signal GO_RDDATA at the next leading edge 146 of the clock signal SCLK.

Referring again to FIG. 5, where the slave devices 107*a*–*n* support the Early slave interface 106A, the timing diagram may be modified. The slave devices 107*a*–*n* may receive the signal EARLY SLAVE COMMAND at the leading edge 130. The particular slave device 107*y* may then present the requested data to the bus 100 within the data transfer cycle 136 for a no-wait cycle transaction.

Figure 7:
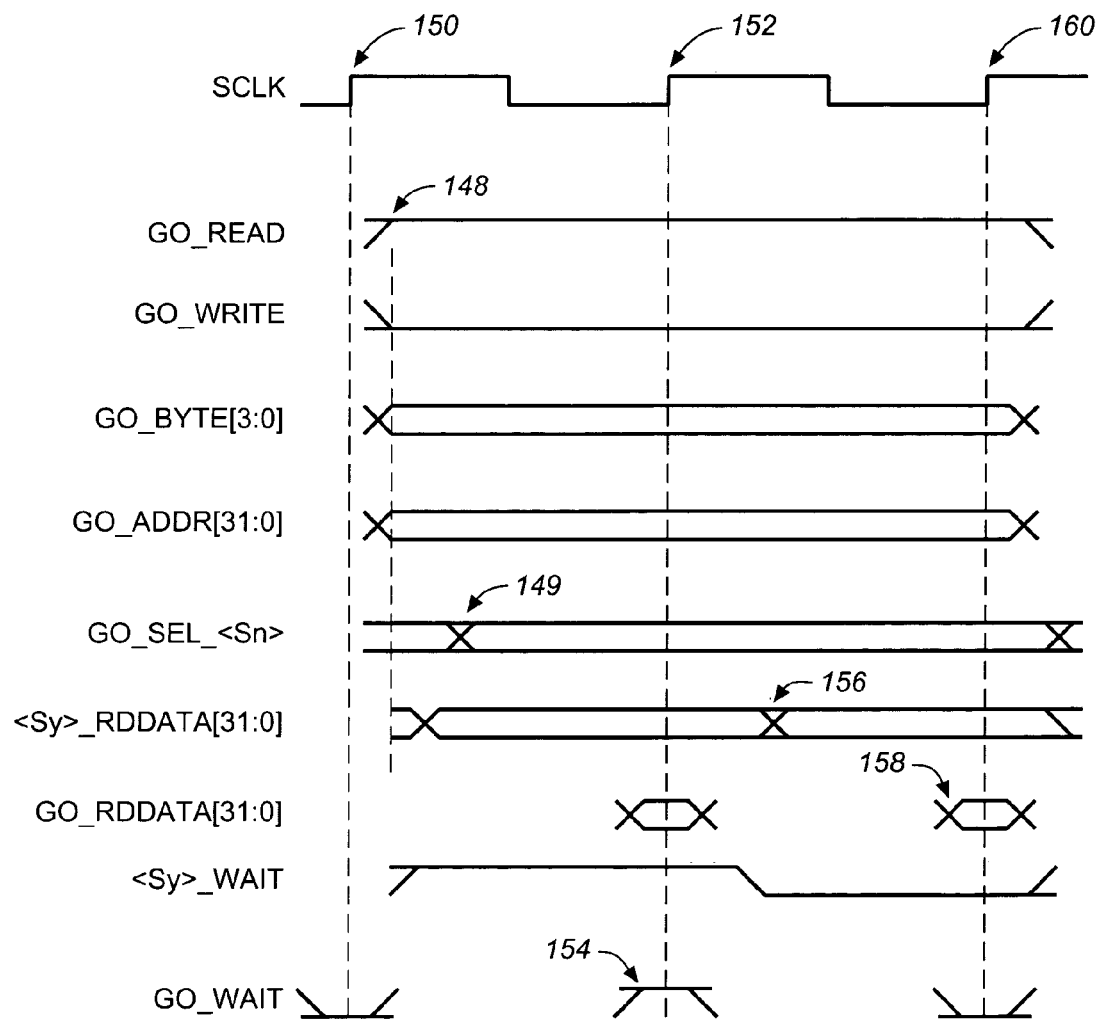
FIG. 7 is a timing diagram of a read data transfer type transaction having one wait cycle.

Referring to FIG. 7, a timing diagram of a read data transfer type transaction having one wait cycle is shown. As before, the signals GO_READ, GO_WRITE, GO_BYTE, and GO_ADDR may become valid at a time (e.g., time 148) after a leading edge (e.g., edge 150) of the clock signal SCLK. The signals GO_SEL_<Sn> may become valid at another time (e.g., time 149). Here, the particular slave device 107*y* responding to the read transaction may be unable to transition the signal <Sy>_RDDATA to present the requested data within one cycle of the clock signal SCLK from the leading edge 150. The particular slave device 107*y* may present the signal <Sy>_WAIT in the logical high state before a next leading edge (e.g., edge 152) of the clock signal SCLK. The signal <Sy>_WAIT in the logical high state generally causes the signal GO_WAIT to transition to the logical high state, as shown at a time (e.g., time 154).

The signal GO_WAIT in the logical high state at the leading edge 152 generally informs the master device 105 that the read data transfer may continue into a next cycle of the clock signal SCLK. The master device 105 may respond to the signal GO_WAIT being in the logical high state by ignoring the signal GO_RDDATA at the leading edge 152.

The particular slave device 107*y* may present the requested data in the signal <Sy>$_{13}$ RDDATA at a time (e.g., time 156) after the leading edge 152. The read data select multiplexer 116A may present the requested data in the signal GO_RDDATA at a time (e.g., time 158) after the signal <Sy>_RDDATA becomes valid at time 156. The master device 105 may accept the requested data in the signal GO_RDDATA at another leading edge (e.g., edge 160) of the clock signal SCLK with the signal GO_WAIT in the logical low state.

Figure 8:
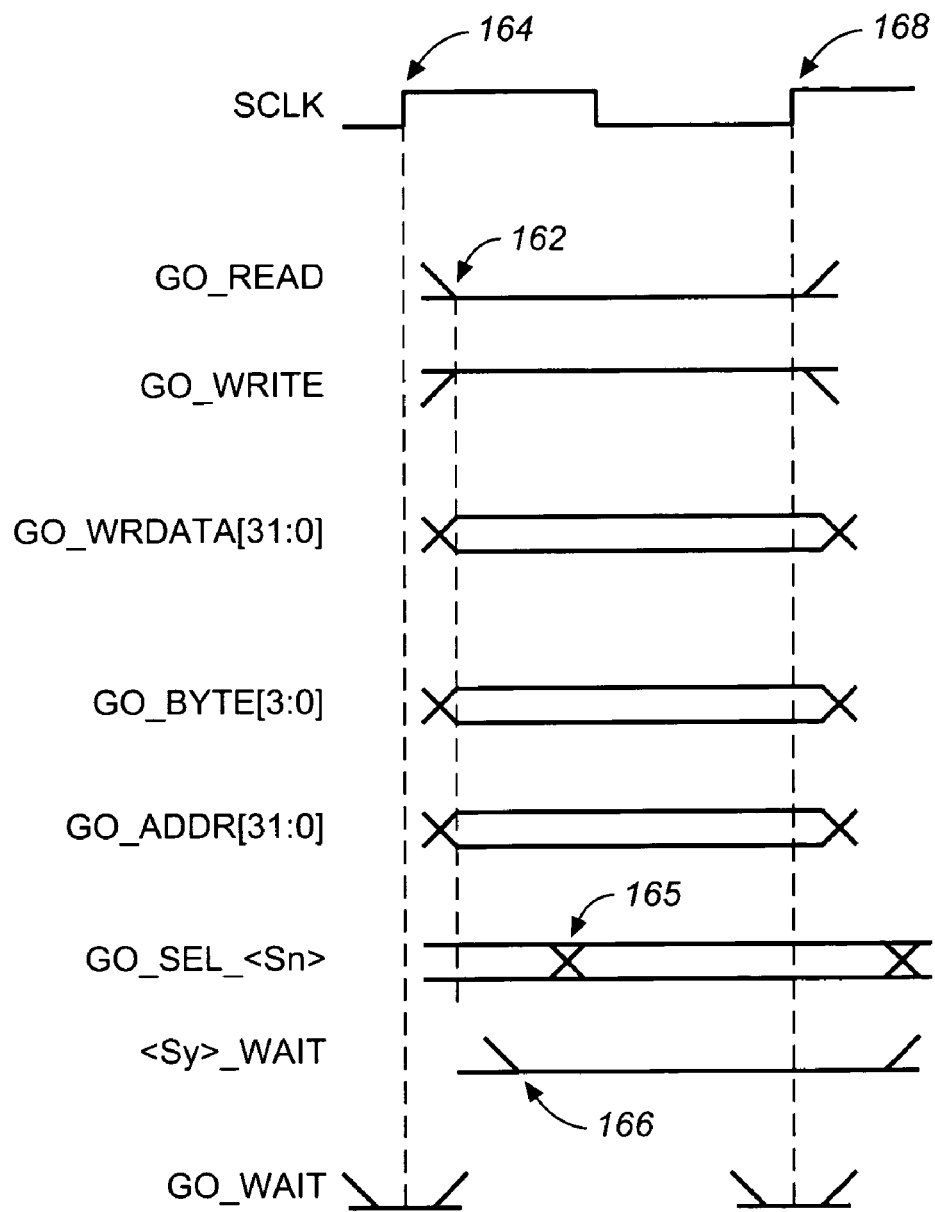
FIG. 8 is a timing diagram for a write data transfer type transaction with no wait cycles.

Referring to FIG. 8, a timing diagram for a write data transfer type transaction with no wait cycles is shown. The signals GO_READ, GO_WRITE, GO_WRDATA, GO_BYTE, and GO_ADDR may be presented to the slave devices 107*a*–*n* at a time (e.g., time 162) after a leading edge (e.g., edge 164) of the clock signal SCLK. The signals GO_SEL_<Sn> may be presented at a later time (e.g., time 165).

At another time (e.g., time 166) the particular slave device 107*y* responding to the write transaction may present the signal <Sy>_WAIT in the logical low state to indicate a readiness to receive the signal GO_WRDATA. At a next leading edge (e.g., edge 168) of the clock signal SCLK, the particular slave device 107y may accept the requested data in the signal GO_WRDATA. The signal GO_WAIT is generally in the logical low state at the leading edge 168 to indicate an end to the write data transfer.

An advantage of the present invention may be the ability to complete the read data transfers and the write data transfers in a single cycle of the clock signal SCLK. The single cycle transaction capability generally allows the present invention to duplicate burst-type data transfers without a need for special burst protocols. Several single cycle data transfers performed back-to-back may provide the same throughput on the bus 100 as a burst-type data transfer of similar length.

Figure 9:
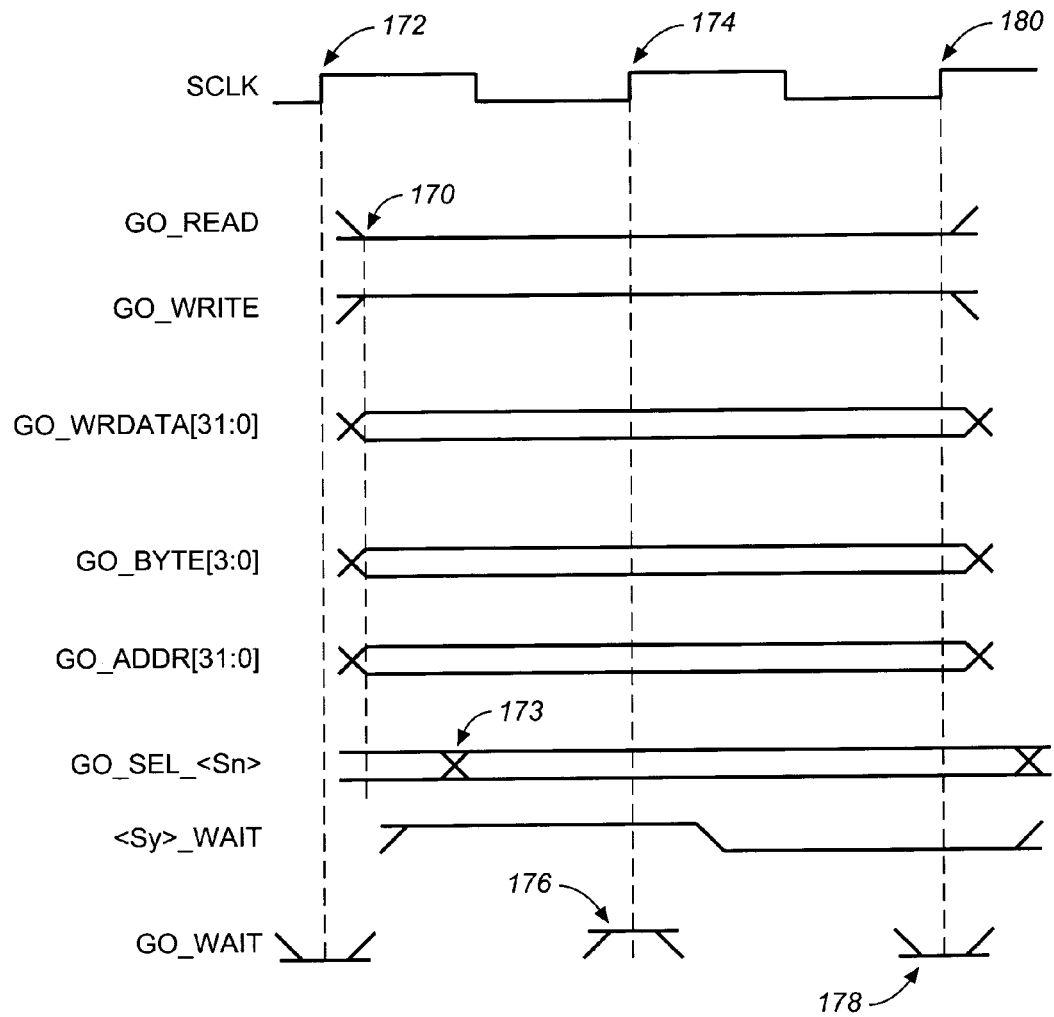
FIG. 9 is a timing diagram of a write data transfer type transaction having one wait cycle.

Referring to FIG. 9, a timing diagram of a write data transfer type transaction having one wait cycle is shown. As before, the signals GO_READ, GO_WRITE, GO_WR-DATA, GO_BYTE, and GO_ADDR may become valid at a time (e.g., time 170) after a leading edge (e.g., edge 172) of the clock signal SCLK. The signals GO_SEL_<Sn> may become valid at a later time (e.g., time 173).

The particular slave device 107y responding to the write transaction may be unable to accept the requested data in the signal GO_WRDATA within one cycle of the clock signal SCLK from the leading edge 172. The particular slave device 107y may present the signal <Sy>_WAIT in the logical high state before a next leading edge (e.g., edge 174) of the clock signal SCLK. The signal <Sy>_WAIT in the logical high state generally causes the signal GO_WAIT to transition to the logical high state, as shown at a time (e.g., time 176).

The signal GO_WAIT in the logical high state at the leading edge 174 generally informs the master device 105 that the write transaction may continue into a next cycle of the clock signal SCLK. The master device 105 may respond to the signal GO_WAIT being in the logical high state by maintaining the signal GO_WRDATA after the leading edge 174.

The particular slave device 107y may become ready to accept the requested data in the signal GO_WRDATA after the leading edge 174. When the particular slave device 107y is ready, the particular slave device 107y generally presents the signal <Sy>_WAIT in the logical low state. A transition of the signal <Sy>_WAIT to the logical low state may cause the signal GO_WAIT to transition to the logical low state a short time (e.g., time 178) later. The particular slave device 107y may accept the requested data in the signal GO_WR-DATA at a next leading edge (e.g., edge 180) of the clock signal SCLK with the signal GO_WAIT in the logical low state. The leading edge 180 with the signal GO_WAIT in the logical low state generally indicates an end to the write transaction.

Referring back FIG. 5, where the slave devices 107a–n supports the Early slave interface 106A, the timing diagram may be modified. The slave devices 107a–n may receive the signal EARLY SLAVE COMMAND and the signal GO_S-_WRDATA at the leading edge 130. The particular slave device 107y may then store the write data in the signal GO_S_WRDATA responsive to the leading edge 130.

Figure 10:
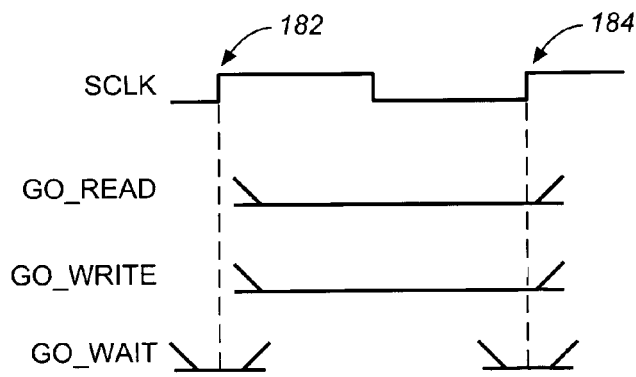
FIG. 10 is a timing diagram of a non-transaction cycle.

Referring to FIG. 10, a timing diagram of a non-transaction cycle is shown. A combination of the signal GO_READ in the logical low state and the signal GO_WRITE in the logical low state generally informs the slave devices 107a–n that there is no transaction to be performed during the cycle of the clock signal SCLK beginning at a leading edge 182. The signal GO_WAIT in the logical low state at a next leading edge 184 generally informs the slave devices 107a–n that the non-transaction cycle has ended and a subsequent cycle may be starting.

Figure 11:
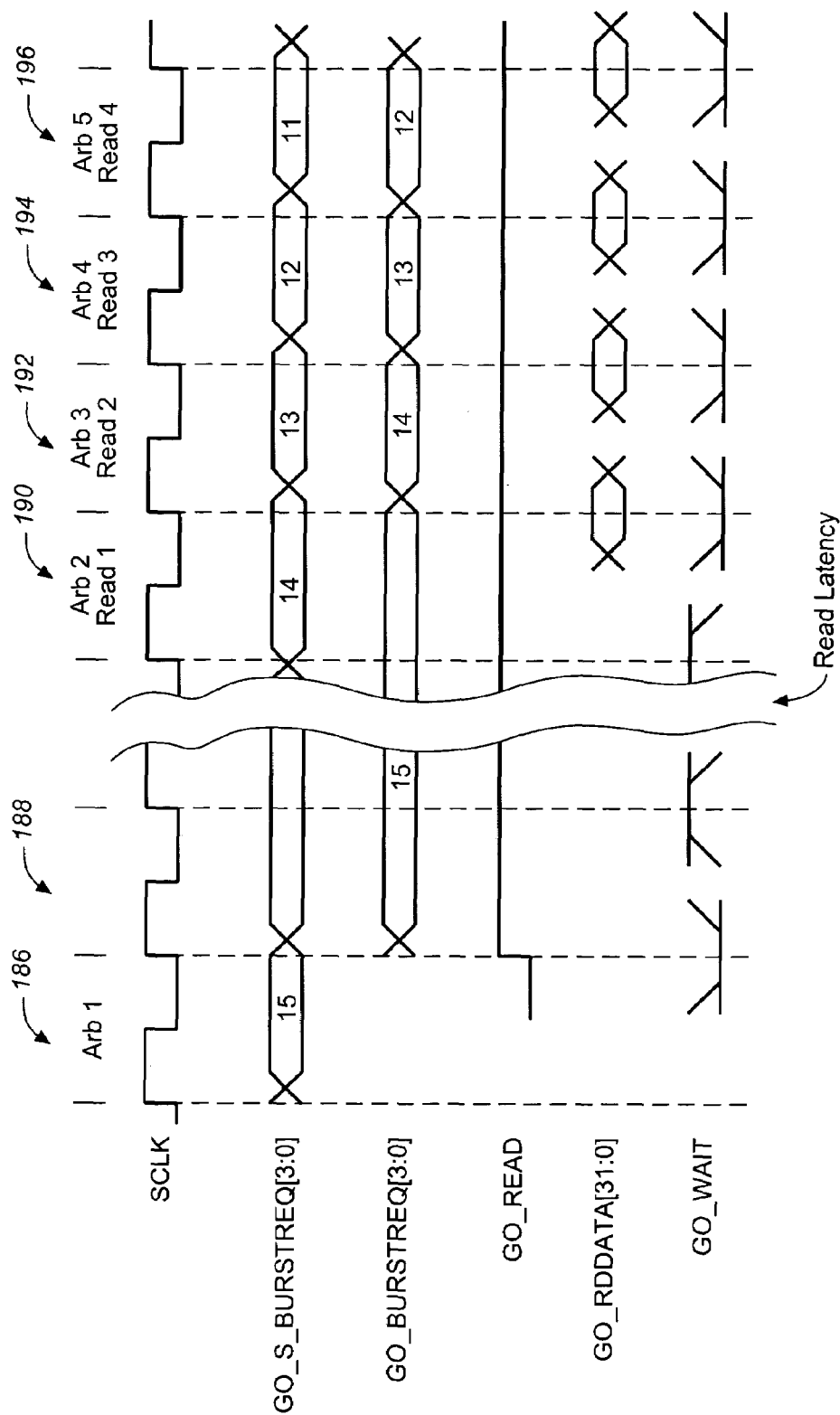
FIG. 11 is a timing diagram of a multi-cycle burst transaction.

Referring to FIG. 11, a timing diagram of a burst read transaction is shown. During an arbitration cycle (e.g., Arb 1, cycle 186) the control logic 102 may present the signal GO_S_BURSTREQ with a burst number N (e.g., 15) of cycles required to complete the burst read transaction. Generally, the burst number N plus one (e.g., N+1) cycles are required for an entire burst transaction.

During the next cycle (e.g., cycle 188) the control logic 102 may present the signal GO_BURSTREQ and the signal GO_READ. At the end of the next cycle 188, the signal GO_WAIT may be asserted in the logical high state. The signal GO_WAIT in the logical high state generally informs the master device 105 that the transaction must continue into the next cycle.

After a potential read latency, the particular slave device 107y may present a first portion of requested data during a subsequent cycle (e.g., cycle 190) as indicated by the signal GO_WAIT in the logical low state. During the subsequent cycle 190, the master device 105 may be required to maintain bus mastership through a second arbitration (e.g., Arb 2).

Having completed a first read in the burst read transaction, the signal GO_S_BURSTREQ may be presented with the number N decremented (e.g., 14) in the subsequent cycle 190 while the signal GO_BURSTREQ may be maintained with the current number (e.g., 15). During each following cycle (e.g., cycles 192, 194, and 196) another portion of requested data is generally presented to the master device 105 and the number within the signals GO_S_BURSTREQ and GO_BURSTREQ are decremented.

Figure 12:
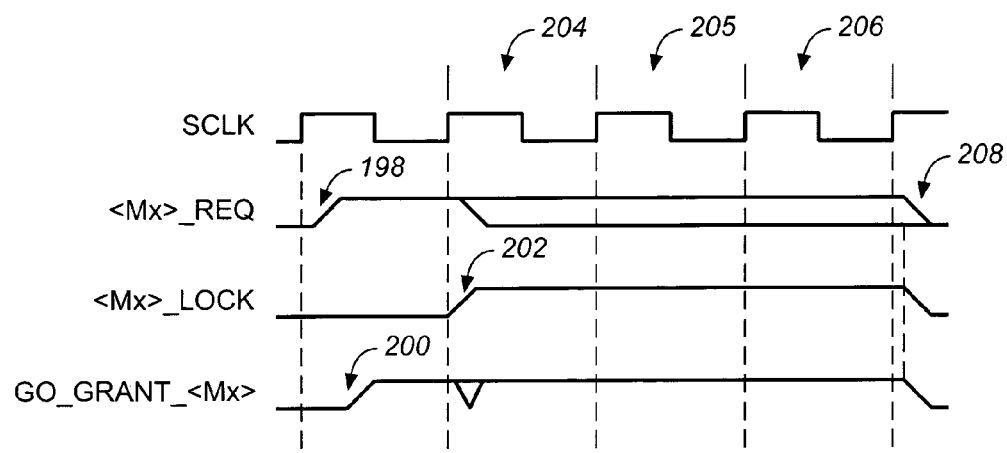
FIG. 12 is a timing diagram of a four-cycle lock transaction.

Referring to FIG. 12, a timing diagram of a four-cycle lock transaction is shown. It is possible that the master device 105 may lose bus mastership in the middle of a burst transaction. To guarantee bus mastership during an entire burst transaction, the master device 105 may lock bus mastership.

During an arbitration cycle, a particular master device 105x generally asserts the signal <Mx>_REQ to request bus mastership at a time (e.g., time 198). The arbitration logic 108 may grant bus mastership to the particular master device 105x by presenting the signal GO_GRANT_<Mx> in the logical high state at a later time (e.g., time 200) than time 198. The particular master device 105x may then present the signal <Mx>_LOCK in the logical high state at a time (e.g., time 202) to prevent any further arbitration.

The particular master device 105x may present the signal <Mx>_LOCK in the logical high state during one or more cycles (e.g., cycles 204 through 206). When the particular master device 105x has completed the burst transaction, the signal <Mx>_LOCK and the signal <Mx>_REQ may be presented in the logical low state at a time (e.g., time 208). The arbitration logic 108 may respond to the signals <Mx>_REQ and <Mx>_LOCK in the logical low state by presenting the signal GO_GRANT_<Mx> in the logical low state.

Figure 13:
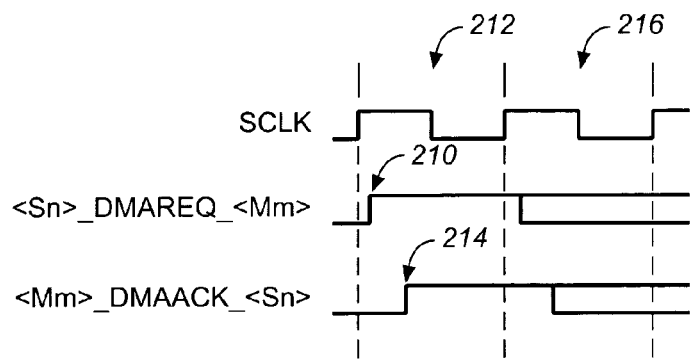
FIG. 13 is a timing diagram of a direct memory access request with an immediate acknowledge.

Referring to FIG. 13, a timing diagram of a DMA request with an immediate acknowledge is shown. The DMA request is generally initiated by the signal <Sn>_DMAREQ_<Mm> being presented in the logical high state at a time (e.g., time 210). Within the same cycle (e.g., cycle 212) as time 210, the signal <Mm>_DMAACK_<Sn> may be presented in the logical high state to acknowledge the DMA request. The signal <Mm>_DMAACK_<Sn> generally transitions to the logical high state at a time (e.g., time 214) later than time 210. In one or more subsequent cycles (e.g., cycle 216) the signal <Sn>_DMAREQ_<Mm> may be presented in the logical low state to end the DMA request. The signal <Mm>_DMAACK_<Sn> may then transition to the logical low state after the signal <Sn>_DMAREQ_<Mm> transitions to the logical low state.

Figure 14:
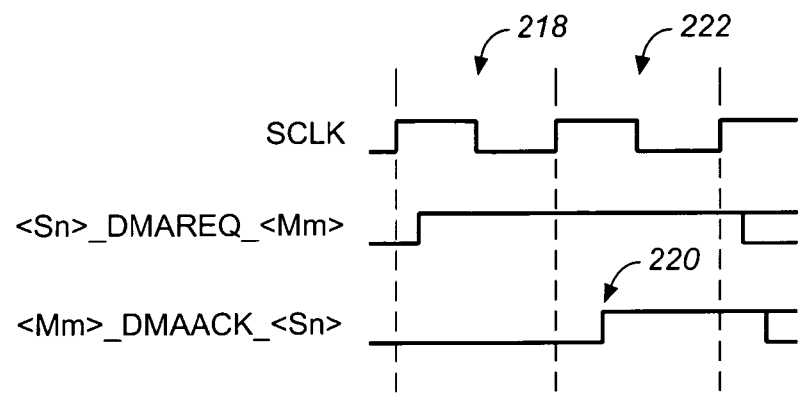
FIG. 14 is a timing diagram of the direct memory access request with a delayed acknowledge.

Referring to FIG. 14, a timing diagram of a DMA request with a delayed acknowledge is shown. Here, the signal <Mm>_DMAACK_<Sn> does not transition to the logical high state in the same cycle (e.g., cycle 218) as the signal <Sn>_DMAREQ_<Mm>. Instead, the signal <Mm>_DMAACK_<Sn> may transition to the logical high state at a time (e.g., time 220) during a next cycle (e.g., cycle 222) after the cycle 218. In general, the particular slave device 107y may present the signal <Sy>_DMAREQ_<Mx> in the logical high state for many cycles of the signal SCLK until the desired master device 105x acknowledges with the signal <Mx>_DMAACK_<Sy>, or the particular slave device 107y abandons the DMA request.

Figure 15:
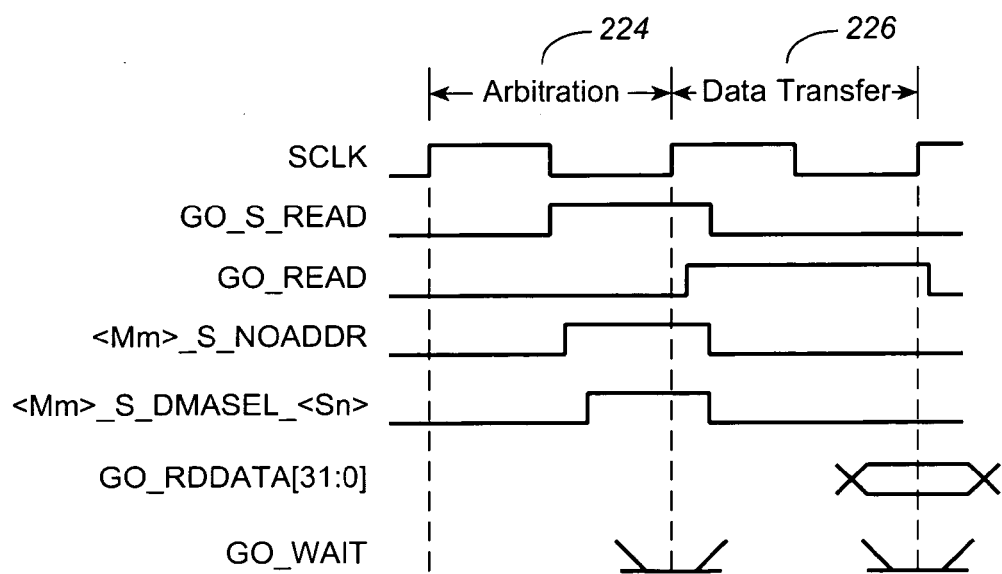
FIG. 15 is a timing diagram of a read transaction from a direct memory access slave.

Referring to FIG. 15, a timing diagram of a DMA write transaction is shown. The DMA write transaction generally involves the master 105 reading from the slave device 107 and then writing to a memory (not shown). A DMA read transaction generally involves the master 105 reading from the memory and then writing to the slave device 107.

The DMA write transaction may begin during an arbitration cycle (e.g., cycle 224). During the arbitration cycle 224, the signal GO_S_READ may be presented in the logical high state. The signal GO_S_READ in the logical high state generally indicates a read transaction from the slave device 107. During the arbitration cycle 224, the signals <Mm>_S_NOADDR and <Mm>_S_DMASEL_<Sn> may be presented in the logical high state. The signal <Mm>_S_NOADDR in the logical high state generally inhibit addressing of the slave device 107 through the signals GO_S_SEL_<Sn> and GO_SEL_<Sn>. The signal <Mm>_S_DMASEL_<Sn> in the logical high state generally selects the slave device 107 participating in the DMA write transaction.

During a data cycle (e.g., cycle 226), the signal GO_READ may be presented in the logical high state. The signal GO_READ in the logical high state generally informs the slave device 107 of the read transaction. The slave device 107 may respond during the data cycle 226 resulting in requested data being presented to the master device 105 in the signal GO_RDDATA with the signal GO_WAIT in the logical low state. The DMA write transaction is complete from the bus 100 point of view at the end of the data transfer cycle 226. Variations for the DMA write transaction with wait cycles and the DMA read transactions with/without wait cycles are similar to the read and write transactions disclosed in FIGS. 5–9 and FIG. 15.

The various signals of the present invention are generally in the logical high state (e.g., "on", asserted, or digital 1) or the logical low state (e.g., "off", deasserted, or digital 0). However, the particular polarities of the logical high state and logical low state of the signals may be adjusted (e.g., reversed) accordingly to meet the design criteria of a particular implementation. The present invention may also be implemented by the preparation of ASICs, FPGAS, or by interconnecting an appropriate network of conventional component circuits, as is described herein, modifications of which will be readily apparent to those skilled in the art(s).

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A bus comprising:
a master interface connectable to a master device external to said bus and configured to (i) receive an early command signal from said master device with an early timing relationship to a first clock edge of a system clock and (ii) present a bus wait signal to said master device, wherein said early timing relationship comprises validity both a set-up time before and a hold-time after a respective edge of said system clock;
a slave interface connectable to a slave device external to said bus and configured to (i) present a command signal to said slave device with a standard timing relationship to said first clock edge, (ii) present said early command signal to said slave device with said early timing relationship to said first clock edge and (iii) receive a slave wait signal from said slave device, wherein said standard timing relationship comprises a delay after said respective clock edge; and
a control logic configured to (i) register said early command signal with said first clock edge to generate said command signal, (ii) multiplex said early command signal to said slave interface and (iii) multiplex said slave wait signal into said bus wait signal.

2. The bus according to claim 1, wherein (i) said master interface is further configured to receive an early address signal from said master device with said early timing relationship to said first clock edge, (ii) said control logic is further configured to (a) multiplex said early address signal to said slave interface, (b) decode said early address signal to present an early device select signal and (c) register both said early address signal and said early device select signal with said first clock edge to generate an address signal and a device select signal, respectively, and (iii) said slave interface is further configured to present (a) both said address signal and said device select signal to said slave device with said standard timing relationship to said first clock edge and (b) both said early address signal and said early device select signal to said slave device with said early timing relationship to said first clock edge.

3. The bus according to claim 2, wherein (i) said master interface is further configured to receive a no-address signal from said master device before said first clock edge and (ii) said control logic is further configured to inhibit both said device select signal and said early device select signal in response to said no-address signal.

4. The bus according to claim 1, wherein (i) said master interface is further configured to receive an early burst request signal from said master device with said early timing relationship to said first clock edge, (ii) said control logic is further configured to (a) multiplex said early burst signal to said slave interface and (b) register said early burst request signal with said first clock edge to generate a burst request signal, and (iii) said slave interface is further configured to present (a) said burst request signal to said slave device with said standard timing relationship to said first clock edge and (b) said early burst request signal to said slave device with said early timing relationship to said first clock edge.

5. The bus according to claim 1, wherein (i) said master interface is further configured to receive a bus request signal from said master device and present a bus grant signal to said master device, and (ii) said control logic is further configured to arbitrate in response to said bus request signal and generate said bus grant signal.

6. The bus according to claim 5, wherein said control logic is further configured to complete arbitration within one clock cycle of said system clock and present said command signal to said slave interface in a next clock cycle of said system clock.

7. The bus according to claim 5, wherein (i) said master interface is further configured to receive a lock signal from said master device, and (ii) said control logic is further configured to halt arbitration responsive to said lock signal.

8. The bus according to claim 1, wherein said control logic comprises an address decoder configured to generate a plurality of early device select signals with said early timing relationship to said first clock edge responsive to an early address signal.

9. The bus according to claim 8, wherein said control logic further comprises a plurality of registers configured to register a plurality of early signals with said early timing relationship to said first clock edge to generate a plurality of standard signals with said standard timing relationship to said first clock edge.

10. The bus according to claim 9, wherein said control logic further comprises an arbitration logic configured to generate a bus grant signal.

11. The bus according to claim 10, wherein said control logic further comprises a first multiplexer configured to multiplex said early signals from said master interface to said slave interface responsive to said bus grant signal.

12. The bus according to claim 11, wherein said control logic further comprises a second multiplexer configured to multiplex a plurality of write data select signals from said master interface to said slave interface responsive to said bus grant signal.

13. A method for operating a bus connectable to a master device and a slave device both external to said bus, comprising the steps of:
(A) receiving an early command signal with an early timing relationship to a first clock edge of a system clock at a master interface of said bus from said master device, wherein said early timing relationship comprises validity both a set-up time before and a hold-time after a respective edge of said system clock;
(B) registering said early command signal with said first clock edge to generate a command signal;
(C) presenting said command signal with a standard timing relationship to said first clock edge at a slave interface of said bus to said slave device, wherein said standard timing relationship comprises validity a delay after said respective clock edge;
(D) multiplexing said early command signal to said slave interface;
(E) receiving a slave wait signal at said slave interface from said slave device;
(F) multiplexing said slave wait signal into a bus wait signal; and
(G) presenting said bus wait signal at said master interface to said master device.

14. The method according to claim 13, further comprising the steps of:
receiving an early address signal with said early timing relationship to said first clock edge at said master interface from said master device;
registering said early address signal in response to said first clock edge to generate an address signal;
presenting said address signal at said slave interface to said slave device with said standard timing relationship to said first clock edge;
presenting said early address signal at said slave interface with said early timing relationship to said first clock edge;
decoding said early address signal to generate an early device select signal; and
presenting said early device select signal at said slave interface to said slave device.

15. The method according to claim 14, further comprising the steps of:
receiving a no-address signal before said first clock edge at said master interface from said master device; and
inhibiting said early device select signal in response to receiving said no-address signal.

16. The method according to claim 13, further comprising the steps of:
receiving an early burst request signal with said early timing relationship to said first clock edge at said master interface from said master device;
registering said early burst request signal with said system clock to generate a burst request signal in response to said first clock edge;
presenting said burst request signal at said slave interface to said slave device with said standard timing relationship to said first clock edge; and
presenting said early burst request signal at said slave interface to said slave device with said early timing relationship to said first clock edge.

17. The method according to claim 13, further comprising the steps of:
receiving a bus request signal at said master interface from said master device;
arbitrating in response to receiving said bus request signal; and
generating a bus grant signal at said master interface to said master device in response to arbitrating.

18. The method according to claim 17, wherein arbitrating is completed within one clock cycle of said system clock and said command signal is presented at said slave interface in a next clock cycle of said system clock.

19. The method according to claim 17, further comprising the steps of:
receiving a lock signal at said master interface from said master device after; and
halting arbitration in response to receiving said lock signal.

20. A bus connectable to a master device and a slave device both external to said bus, comprising:
means for receiving an early command signal with an early timing relationship to a first clock edge of a system clock at a master interface from said master device, wherein said early timing relationship comprises validity both a set-up time before and a hold-time after a respective edge of said system clock;
means for registering said early command signal with said first clock edge to generate a command signal;
means for presenting said command signal with a standard timing relationship to said first clock edge at a slave interface to said slave device, wherein said standard timing relationship comprises validity a delay after said respective clock edge;
means for receiving a slave wait signal at said slave interface from said slave device;
means for multiplexing said slave wait signal into a bus wait signal; and
means for presenting said bus wait signal at said master interface to said master device.

* * * * *